(12) United States Patent
Kirino et al.

(10) Patent No.: US 6,266,324 B1
(45) Date of Patent: *Jul. 24, 2001

(54) ATM DEVICE AND SHAPING METHOD

(75) Inventors: Kiyoshi Kirino; Nobuyuki Mizukoshi; Hideo Ishida, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,038

(22) Filed: Apr. 22, 1998

(30) Foreign Application Priority Data

Apr. 23, 1997 (JP) ................................... 9-106009

(51) Int. Cl.⁷ ....................................................... H04J 1/16
(52) U.S. Cl. .......................................... 370/230; 370/395
(58) Field of Search ................................... 370/395–400, 370/230, 235, 351, 387, 388, 389, 391, 419, 412, 413, 414, 422, 428

(56) References Cited

U.S. PATENT DOCUMENTS

| | | | |
|---|---|---|---|
| 5,280,475 | * | 1/1994 | Yanagi et al. ........................ 370/60 |
| 5,791,865 | * | 8/1998 | Bublitz ............................ 414/794.4 |
| 5,799,014 | * | 8/1998 | Kozaki et al. ....................... 370/358 |
| 5,940,375 | * | 8/1999 | Soumiya et al. ..................... 370/249 |
| 6,005,868 | * | 12/1999 | Ito ....................................... 370/413 |
| 6,028,843 | * | 2/2000 | Delp et al. ........................... 370/235 |

FOREIGN PATENT DOCUMENTS

| | | |
|---|---|---|
| 0 471 344 A1 | 8/1991 | (EP) . |
| 0 753 981 A2 | 7/1996 | (EP) . |
| 2-121549 | 5/1990 | (JP) . |
| 4-98938 | 3/1992 | (JP) . |
| 8-125668 | 5/1996 | (JP) . |
| 8-163150 | 6/1996 | (JP) . |

OTHER PUBLICATIONS

ATM and Multiprotocol Networking, Sackett et al., pp 203, 1996.*
ATM Foundation For Broadband Networks, Black, pp: 206, 224–233, 1995.*
Wallmeier, E., et al. "Traffic control in ATM switches with large buffers," Munich, Germany, pp. 45–60, Nov. 7, 1995.
Japanese Office Action, dated Dec. 2, 1998, with English language translation of Japanese Examiner's comments.

* cited by examiner

*Primary Examiner*—David R. Vincent
(74) *Attorney, Agent, or Firm*—McGuireWoods LLP

(57) ABSTRACT

In an ATM device comprising a switch core 11, a port shaping unit 25 is arranged within the switch core 11 to carry out a port shaping operation. The port shaping unit 25 controls reading timing of each cell stored in a shared buffer 10. Therefore, a delay to absorb the CDV is decided by the reading timing and the port shaping operation is achieved within the ATM device without attaching any additional memories to the ATM device.

6 Claims, 8 Drawing Sheets

ATM DEVICE AND SHAPING METHOD

BACKGROUND OF THE INVENTION

This invention relates to an asynchronous transfer mode (ATM) device and, in particular, to an ATM device which is included in an ATM network to provide a Constant Bit Rate (CBR) service as a network service.

In an ATM network of the type described, a data stream or string is transmitted through an ATM device in the form of ATM cells each of which has a fixed length.

Specifically, such an ATM cell consists of the fixed length of 53 bytes which is divisible into a payload field of 48 bytes and a header field of 5 bytes. Herein, the payload field is given user information or the like and may be therefore called an information field.

In the ATM network, a plurality of virtual channels (VCs) are prepared as communication channels to establish a connection between a user terminal and an ATM device and a connection between ATM devices. Furthermore, a cluster or group of the virtual channels (VCs) is referred to as a virtual path (VP). In this connection, a plurality of VCs can be included in a single virtual path (VP) or can be assigned to one transmission line.

Under the circumstances, the ATM device mentioned above is used to decide either only a VC or both a VC and a VP, through which the ATM cells are transmitted. To this end, a virtual path identifier (VPI) and a virtual channel identifier (VCI) are arranged in the header field of each ATM cell to identify both the virtual path and the virtual channel.

Specifically, such an ATM device has a plurality of input ports and a plurality of output ports and mainly carry out a switch operation to establish routes determined by such as a VC and a VP. Therefore, the ATM device is sometimes called an ATM switch board, an ATM switch, or an ATM exchange. When an ATM cell is given through each of the input ports (the input ATM cell is simply called an input cell hereinafter), the ATM device selects an output port through which the input cell should be sent, referring to the VPI and/or the VCI of the input cell. Once the output port is selected, the ATM device converts the VPI and/or the VCI into a VPI and/or a VCI that correspond to a next VP and/or a next VC. In addition, the switch operation is carried out to set up a route, and the ATM cell is sent as an output cell to the output port through the route.

Among the ATM networks, such an ATM device that only executes the switch operation concerned with the VP alone is especially called a VP handler while an ATM device that executes the switch operation concerned with the VC is called a VC handler.

Further explanation will be made about structure of the ATM device.

The ATM device includes a buffer that stores ATM cells, and a switch core that controls write/read operation of ATM cells into/from the buffer. In detail, the switch core has line interfaces that correspond to the input ports and the output ports, and a header translator that is connected to each line interface. Herein, one of the line interfaces coupled to the input ports, is called an input interface. On the other hands, another one of the line interfaces coupled to the output ports, is called an output interface.

Data transmission in the ATM network, which comprises the above mentioned ATM devices, is classified into three levels composed of a physical layer, an ATM layer, and an ATM adaptation layer (AAL). Specifically, the ATM layer mainly transmits the ATM cells and also multiplexes, divides, and routes the ATM cells. The AAL stands on the ATM layer and conceals the behaviour of the ATM layer from the upper layer.

Specifically, the AAL can provide the upper layer with four categorized services; a CBR service class, a variable bit rate (VBR) service class, an unspecified bit rate (UBR) service class, and an available bit rate (ABR) service class.

Among the above services, the CBR service is effective to transmit high isochronal traffic, such as voice signal or data through voice lines. This means that the traffic of the CBR service requires to maintain synchronicity between a transmitter and a receiver.

In order to indicate performance on transferring cells in the ATM network, a cell delay variation (CDV) can be stated as one of parameters. As mentioned before, an ATM cell that is output from a transmitter is transmitted to a receiver through the connection that is established in the ATM network. During the transmission, such an ATM cell suffers from various kinds of delays, such as a transmission delay on the transmission line and a switching delay in the ATM device, which is described later. Furthermore, the delay is also affected by an amount of the traffic on the transmission line through which each ATM cell is transmitted. As a result, each ATM cell might not always have the same delay, and therefore the delay time might vary in each ATM cell. In this case, a difference between a cell transfer delay and an average cell transfer delay on a connection, is called the CDV described before.

If the CDV fluctuates beyond its limitation, the synchronicity between the transmitter and the receiver can not be maintained in the system that provides the CBR service. As a result, the system users can not reproduce exactly the CBR service data such as the voice data. Thus, it is necessary to absorb as such effect of CDV as possible in the system that provides the CBR service.

One of ways to absorb the effect of the CDV, to regulate the traffic, and to maintain the transmission quality in the network, is a shaping method. The shaping method is to accumulate ATM cells in a memory for shaping, and to rearrange the ATM cells. Especially, such a shaping method is used in each output port side of the ATM devices and is called a port shaping method.

A conventional shaping method in the stage posterior to the output port (henceforth the conventional shaping method) is disclosed in Japanese Unexamined Patent Publication (JP-A) No. 8-163150.

As for the conventional shaping method, a shaping unit to shape ATM cells comprises a shaping FIFO, a monitor circuit to monitor the shaping FIFO, and a control circuit to control the shaping FIFO by responding to signals from the monitor circuit. The shaping unit is usually arranged in each stage posterior to the output ports of ATM devices. When the shaping unit receives ATM cells from an output port that the shaping FIFO corresponds to, the monitor circuit monitors a time when each of the ATM cells is accumulated in the shaping FIFO. In this end, each ATM cell is given each delay time, by accumulated in the shaping FIFO for a time monitored by the monitor circuit. Herein, each delay time is to adjust a cell transfer delay of each ATM cell to one predetermined value, that is, CDVs of the ATM cells are absorbed by given the delay times. When the monitor circuit recognizes that each of the ATM cells is accumulated in the shaping FIFO for each delay time, the monitor circuit outputs an output signal to control circuit at each ATM cell. The control circuit controls the shaping FIFO by receiving the signal from the monitor circuit. Thus, each ATM cell is given the above delay time by regulation of the control circuit and the monitor circuit, and the shaping FIFO sends out shaped ATM cells.

The conventional shaping method which uses the conventional shaping unit delays ATM cells for the delay times each corresponding to the ATM cells, outputs the accumulated ATM cells at a certain interval, and thereby shapes the ATM cells. Resides, since a maximum of the CDV that happens on the ATM network is guaranteed to be a given value on the network, the conventional shaping unit employs the maximum of the CDV as the maximum delay time of the accumulated ATM cells in the shaping FIFO.

As understood from the above, the conventional shaping unit can absorb differences between the CDVs of the ATM cells and sends out the output cells from the output interface at a certain interval by generating the delay time in the shaping FIFO.

However, the structure mentioned above is disadvantageous in that the hardware of the conventional ATM device becomes bulky since it is necessary to put the shaping units into each of the output ports of the ATM device.

Furthermore, it is necessary that additional units should be added as the shaping units to the conventional ATM device without utilizing hardware of the conventional ATM device.

SUMMARY OF THE INVENTION

It is an object of this invention to provide an ATM device that does not need to prepare additional hardware or buffers for a shaping operation to each output port and that is therefore compact in structure.

It is another object of this invention to provide a port shaping method that can be applied to the above-mentioned ATM device.

According to this invention, there is provided an ATM device, including: a plurality of input ports for responding to input cells, respectively; a plurality of output ports for producing output cells; a buffer, between the input and the output ports, for storing said input cells one by one to output said input cells is said output cells toward said output ports; and a switch core coupled to the input and the output ports for controlling said buffer to adjust access timing of the buffer and to thereby execute port shaping operation of the output cells sent to the output ports.

DESCRIPTION OF THE PREFERRED EMBODIMENT

Prior to description of embodiments of this invention, brief description of an ATM device will at first be made for a better understanding of this invention.

In terms of buffer arrangements of ATM devices, ATM devices can be categorized into an output buffer type, a shared buffer type, a cross point buffer type, and an input-output buffer type. As for the output buffer type and the shared buffer type, if an ATM device has input ports, N in number, and output ports, N in number, a buffer memory of the ATM device requires a N times processing rate faster than the input rate of ATM cells. On the other hand, a buffer memory of the cross point buffer type or the input-output buffer type does not require such a fast processing rate. Furthermore, the shared buffer type generally requires the fewest buffer memories among the four buffer types. The output buffer type, the input-output buffer type, and the cross point buffer type, require more buffer memories in this order.

Among the above-mentioned ATM devices, the ATM device of the shared buffer type (henceforth, the shared buffer type ATM device) can share the buffer memories with N ports in number. Because of the above-mentioned characteristics, the shared buffer type ATM device is often used on the ATM network that provides the CBR services. Thus, the shared buffer type ATM device will be explained as a good example of the embodiment of this invention.

Now, explanation of a preferred embodiment of this invention will be made with reference to drawings, applying this invention to the shared buffer type ATM device.

Figure 1:
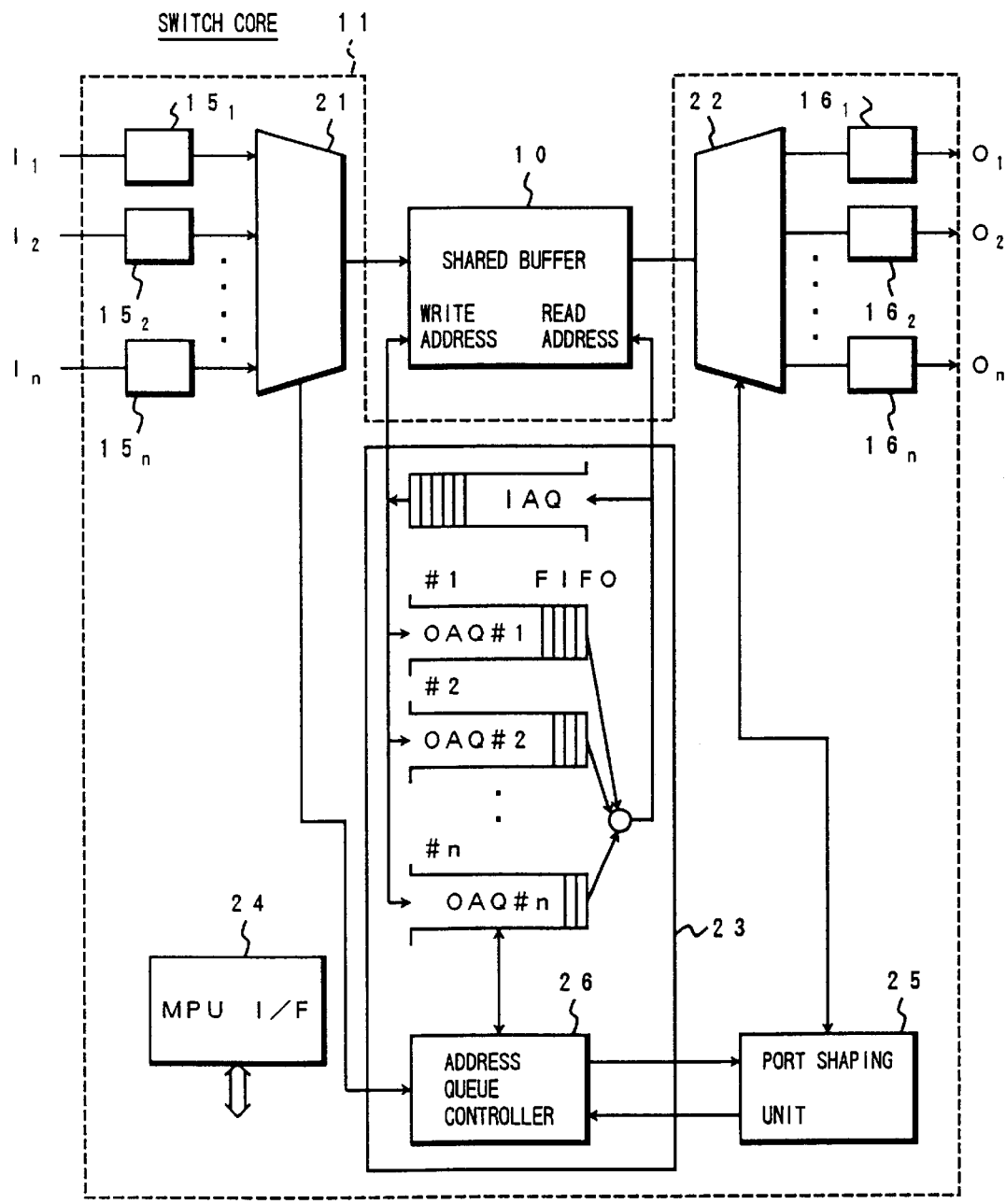
FIG. 1 schematically shows a block diagram of an ATM device according to a first embodiment of this invention.

Referring to FIG. 1, the shared buffer type ATM device according to the preferred embodiment of this invention comprises a shared buffer 10 and a switch core 11.

The switch core 11 has a cell multiplexer 21 which corresponds to incoming trunks $I_1$~$I_n$ and a cell demultiplexer 22 which corresponds to outgoing trunks $O_1$~$O_n$. Each incoming trunk $I_1$~$I_n$ is connected to each physical input port (not shown in FIG. 1) while each outgoing trunk $O_1$~$O_n$ is connected to each physical output port (not shown in FIG. 1).

Furthermore, the switch core 11 has header translators $15_1$~$15_n$ between the physical input ports and the cell multiplexer 21 and header translators $16_1$~$16_n$ between the physical output ports and the cell demultiplexer 22, as shown in FIG. 1. Both the header translators $15_1$~$15_n$ and the header translators $16_1$~$16_n$ include line interfaces and header translation tables (HTTs).

The switch core 11 shown in FIG. 1 comprises a queue controller 23, a micro processing unit interface (MPU I/F) 24, and a port shaping unit 25. In the queue controller 23, an idle address queue (IAQ) FIFO (simply called IAQ) is included which stores or keeps an idle address of a shared buffer 10 in the form of an idle address queue. In addition, output address queue (OAQ) FIFOs (OAQs #1~#n) are also included in the queue controller 23 and correspond to the outgoing trunks $O_1 \sim O_n$, respectively, and keep addresses of ATM cells in the shared buffer 10 destined to each outgoing trunk as queues. Furthermore, an address queue controller 26 is included in the queue controller 23 to control these address queues in a manner to be described later.

The address queue controller 26 is supplied from the header translators $15_1 \sim 15_n$ through the cell multiplexer 21, with data signals related to output ports which output input cells. The address queue controller 26 controls reading from the IAQ and writing to the OAQ. The address queue controller 26 controls the operation such that the IAQ and the OAQ provide the shared buffer 10 with the read addresses and the write addresses, respectively.

Now, the switch core 11 shown in FIG. 1 will be described later.

Responsive to ATM cells sent from n incoming trunks $I_1 \sim I_n$, the cell multiplexer 21 in the switch core 11 simply multiplexes the ATM cells in a given order of numbers added to the incoming trunks into a multiplexed cell. Meanwhile, the header translators $15_1 \sim 15_n$ obtain data of each input ATM cell about a destined output port, referring to header data of the ATM cell, and sends out the data about the output port through the cell multiplexer 21 to the address queue controller 26 included in the queue controller 23.

While obtaining the above data from the header translators $15_1 \sim 15_n$, the address queue controller 26 acquires, for each of the ATM cells, an idle address queue of an idle address in the shared buffer 10 from the IAQ, and controls the shared buffer 10 so as to write data of each ATM cell into a region of the shared buffer 10. At the same time, the address queue controller 26 controls the writing operation of the idle address of each ATM cell from the IAQ to one of the OAQs #1~#n to establish the address queue in one of the OAQs #1~#n. Herein, it is to be noted that OAQs #1 to #n correspond to output ports. In this manner, the address queue controller 26 obtains the idle address queue and removes the idle address queue from the IAQ. The idle address is changed into the address which actually stores the ATM cell and which is not idle any longer.

As understood from the above, it can be said that the shared buffer 10 substantially has virtual buffers in itself for each of the output ports and that the OAQs #1~#n control the virtual buffers for each of the corresponding output ports.

The switch core 11 executes to read cell data from the shared buffer 10, by getting data stored in all virtual buffers in a given order under the control of the address queue controller 26. Thus, the switch core 11 can obtain preferable cell data from the virtual buffers of the shared buffers 10 that correspond to one of the output ports by utilizing the address data written in the OAQs as the read addresses in the shared buffer 10. The addresses, from which the written cell data are extracted, become empty or idle. Such idle addresses are written into the IAQs as idle address queues and serve to control idle addresses in the shared buffer 10.

Especially, the illustrated ATM device comprises the port shaping unit 25 which is connected to the cell demultiplexer 22 and the queue controller 23 and which performs the port shaping operation.

The port shaping unit 25 monitors the outgoing trunks $O_1 \sim O_n$ through the cell demultiplexer 22 and changes the cell transfer delays of the cells into one predetermined value. Thus, the port shaping unit 25 regulates or adjust transmission rates of output cells. Consequently, the output cells are sent from the outgoing trunks $O_1 \sim O_n$ at the transmission rates determined for the outgoing trunks $O_1 \sim O_n$. Thus, the port shaping operation is performed by the port shaping unit 25.

Specifically, the above mentioned port shaping operation can be embodied in the following manner by the use of the port shaping unit 25 and other components.

As for the example shown in FIG. 1, the address queue controller 26 obtains the number of the cells stored in each virtual buffer by monitoring the OAQs #1~#n, and sends out the stored cell data to the port shaping unit 25.

The port shaping unit 25 calculates or controls shaping timing by counting given clock numbers and sends out an indication signal to the cell demultiplexer 22 by following the stored cell data in each output port and the shaping timing. It is to be noted that the shaping timing appears at a certain period or cycle.

The cell demultiplexer 22 successively polls each output port and selects an output port number by following the polling result and the indication signal from the port shaping unit 25. Thereafter, the cell demultiplexer 22 sends out the selected output port number to the address queue controller 26. In case of FIG. 1, the output port number selected by the cell demultiplexor 22 is sent out to the address queue controller 26 through the port shaping unit 25. However, the output port number may be sent out directly to the address queue controller 26, bypassing the port shaping unit 25.

The address queue controller 26 obtains an address in the shared buffer from the OAQ, which responds with the output port number selected by the cell demultiplexer 22. Using the address, the address queue controller 26 reads preferable cell data from the shared buffer 10.

As understood from the above-mentioned process, each reading timing of cell data from the shared buffer 10 is regulated by the port shaping unit 25. Herein, each reading timing gives suitable delay at each of ATM cells in the shared buffer 10. As a result, the CDVs of the ATM cells are absorbed in the shared buffer 10.

As a result, the cell data obtained by the shared buffer 10 are sent out as output cells from the selected output port through the cell demultiplexer 22 in a certain interval.

As described above, since the ATM device shown in FIG. 1 comprises the port shaping unit 25 in the switch core 11, the ATM device can control the reading timing of the cell data of each cell from the shared buffer 10. Therefore, a delay to absorb the CDV is decided by the reading timing from the shared buffer 10. Thus, the port shaping operation is achieved within the shared buffer 10 and the switch core 11 of the ATM device shown in FIG. 1 without any memories or the like additional to the switch core 11.

In comparison with the embodiment according to this invention, the conventional ATM device mentioned above requires shaping units including FIFOs, which are set up in each stage posterior to the output ports of the ATM device.

This comparison makes it easy to understand that the ATM device shown in FIG. 1 can be more compact than the conventional ATM device that requires FIFOs for each of the output ports.

As for explanation of the other embodiment of this invention, a word, UTOPIA, may be found in the trend of the ATM environment. UTOPIA stands for Universal Test & Operations PHY Interface for ATM, and defines a data pass interface between the ATM layer and the physical layer. The Utopia level 2 was issued by the ATM Forum Technical Committee in June 1995, and a UTOPIA LEVEL 2 Interface was defined there.

Figure 2:
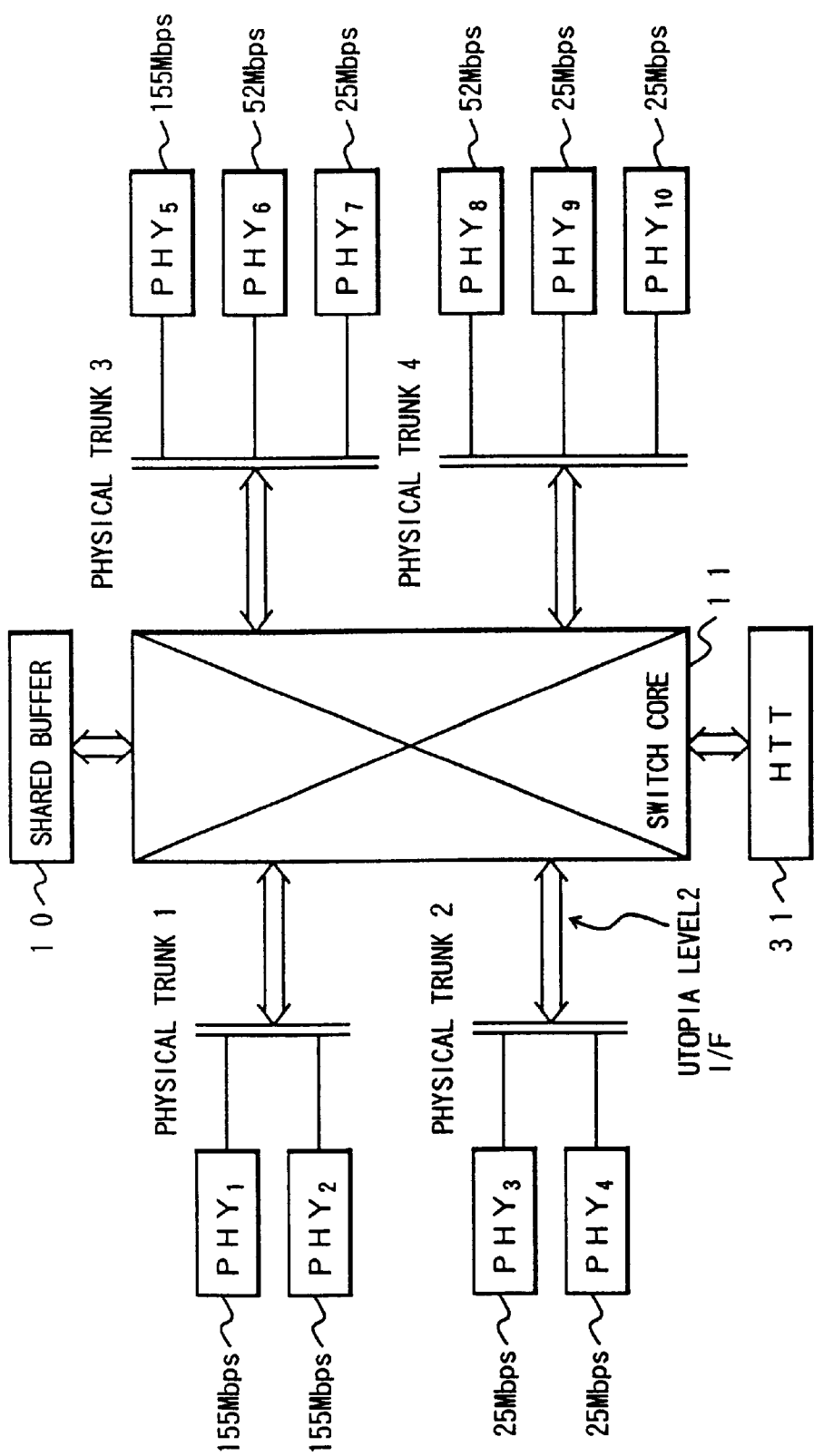
FIG. 2 shows a block diagram of an ATM device according to another embodiment of this invention.

As shown in FIG. 2, a shared buffer type ATM device according to another embodiment of this invention comprises the UTOPIA LEVEL 2 interface, and also comprises the shared buffer 10 and the switch core 11 as shown in FIG. 1. In the ATM device shown in FIG. 2, a header translation table (HTT) 31 stores data such as output port number for switching, and is directly connected to the switch core 11. The switch core 11 is connected through physical trunks 1~4 to PHY device$_1$~device$_{10}$ (abbreviated to PHY$_1$~PHY$_{10}$), all of which function as physical layer devices. These physical trunks 1~4 between the PHYs and the switch core 11 comprise an interface that relates to the above mentioned Utopia Level 2. In the shown embodiment, PHY$_1$, PHY$_2$, and PHY$_5$, transmit cell data at a rate of 115 Mbps, and PHY$_3$, PHY$_4$, PHY$_7$, PHY$_9$, and PHY$_{10}$, transmit cell data at a rate of 25 Mbps, and besides, PHY$_6$ and PHY$_8$ transmit cell data at a rate of 52 Mbps.

Even if an ATM device has the above mentioned structure, the port shaping operation can be seen in the switch core 11 shown in FIG. 1. And for brief explanation of FIG. 2, it is supposed that input cells are sent into the switch core 11 through the physical trunks 1 and 2, and that output cells are sent out through the physical trunks 3 and 4. Thus, the following explanation is supposed that the switch core 11 comprises an input interface corresponding to the physical trunks 1 and 2, and an output interface corresponding to the physical trunks 3 and 4.

Figure 3:
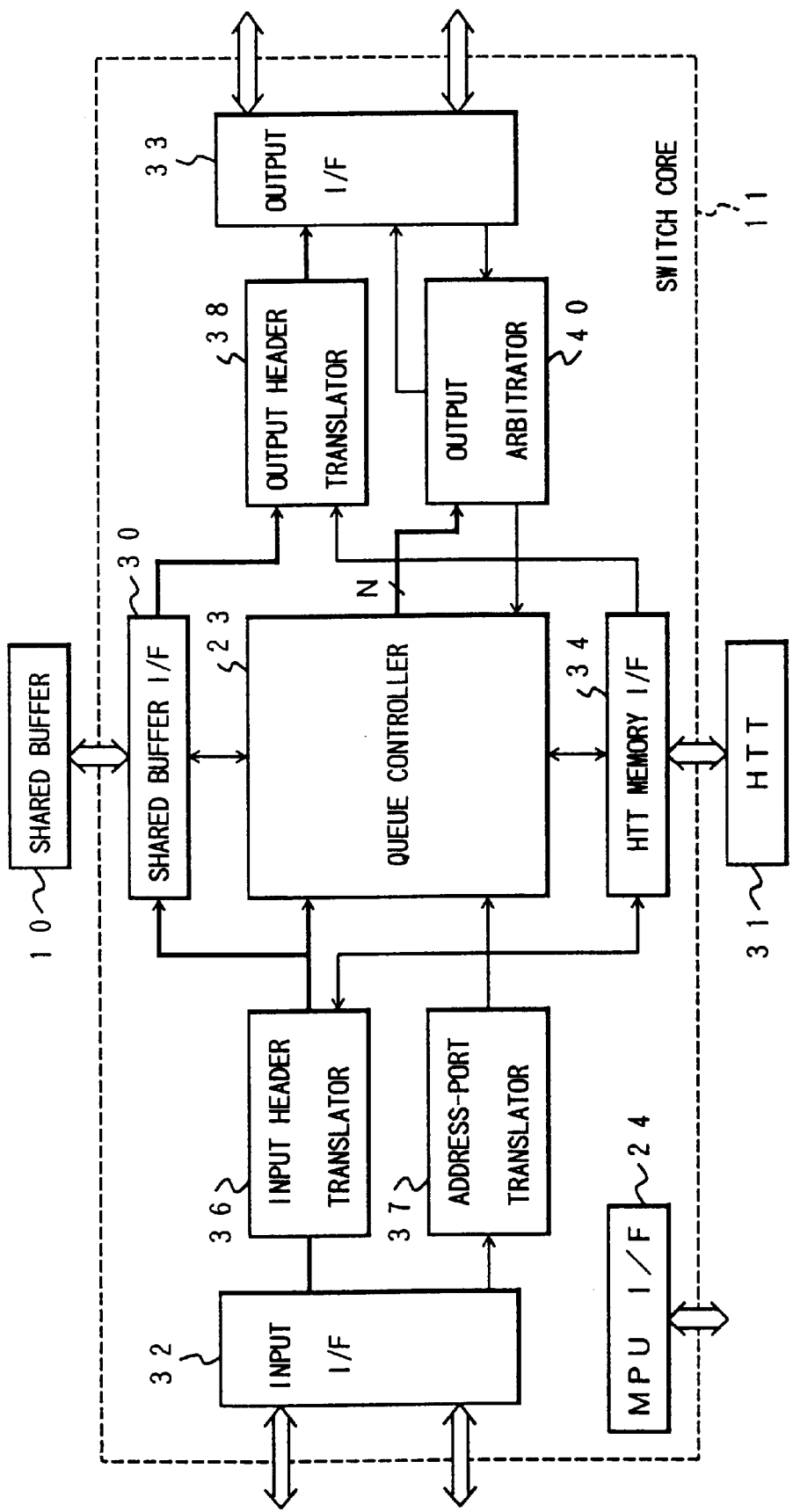
FIG. 3 shows a block diagram of a switch core illustrated in FIG. 2.

In references to FIG. 2 and FIG. 3 for further explanation of this embodiment, the switch core 11 shown in FIG. 3 comprises the input interface (Input I/F) 32 corresponding to the physical trunks 1 and 2 shown in FIG. 2, the output interface 33 corresponding to the physical trunks 3 and 4 shown in FIG. 2, the queue controller 23 and the MPU I/F 24 shown in FIG. 1. Furthermore, the switch core 11 shown in FIG. 2 and FIG. 3 comprises a shared buffer interface (shared buffer I/F) 30 between the shared buffer 10 and the queue controller 23 and a HTT memory interface (HTT memory I/F) 34 between the HTT 31 and the queue controller 23.

The switch core 11 also comprises an input header translator 36, an address-port translator 37, and an output header translator 38. In this figure, the input header translator 36 is not only connected to the queue controller 23 and to the input I/F 32, but also connected to the shared buffer I/F 30 and the HTT memory I/F 34. The address-port translator 37 translates a physical address into an input port number and is arranged between the input I/F 32 and the queue controller 23 in FIG. 3. The output header translator 38 is not only connected to the queue controller 23 and to the output I/F 33, but also connected to the shared buffer I/F 30 and the HTT memory I/F 34.

In the illustrated switch core 11, an output arbitrator 40 is connected to the queue controller 23 and the output port I/F 33 so as to carry out the port shaping operation according to this invention.

In detail, the ATM device illustrated in FIG. 3 acts as follows.

The input header translator 36 illustrated in FIG. 3 carries out a translation operation for the header of the input cell. Responsive to an input cell through the input I/F 32, the input header translator 36 accesses the HTT 31 through the HTT memory I/F 34 and searches an index in the HTT 31, referring to VPI/VCI stored by a header of the input cell. When getting an output cell number as the result of the search, the input header translator 36 writes the output cell number into the cell header. The written data is used for routing in the switch, output port selection in the cell decomplexer, and quality control such as cell lose priority in the buffer.

The HTT 31 outputs data about switch routing into the queue controller 23.

The queue controller 23 writes cell data into the shared buffer 10, by following the data from the HTT 31. Responsive to the data, the queue controller 23 selects one of idle addresses in the shared buffer 10. And then, the queue controller 23 outputs the selected idle address into the shared buffer 10. Herein, the selected idle address serves as a write address in the shared buffer 10, to which a cell data from the input header translator 36 will be written or stored. That is, the selected idle address changes into the write address, and is no longer an idle address. Furthermore, the queue controller 23 stores and address queue of the write address into an OAQ that corresponds to the output port number.

As described above, the queue controller 23 designates the write addresses for cell data of the input cells respectively, to which the shared buffer 10 stores the cell data, and writes the address queues of the write addresses to the OAQs #1~#n, which correspond to output ports respectively.

On the other hand, the output arbitrator 40 determines an output port number, whose port is ready to output, and carries out the port shaping by controlling the readout timing of a cell data from the shared buffer 10 through the queue controller 23.

The output arbitrator 40 will be further described by reference to FIG. 4.

Figure 4:
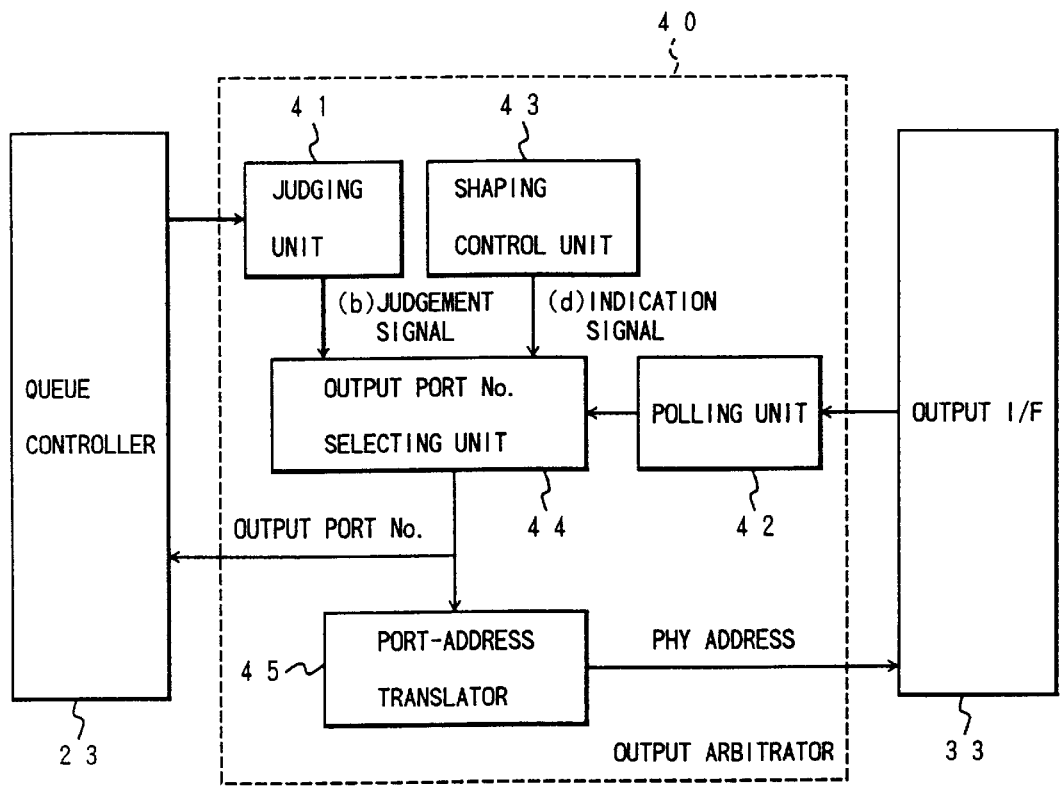
FIG. 4 shows a block diagram of an example of an output arbitrator illustrated in FIG. 3.

The output arbitrator 40 shown in FIG. 4 is arranged between the queue controller 23 and the output I/F 33 and includes a judging unit 41 and a polling unit 42. Herein, the judging unit 41 receives accumulated cell data (queue data) of each output port from the queue controller 23 and then judges a condition of cells accumulated in each output port (especially judges whether or not cells are accumulated). On the other hand, the polling unit 42 is operable to poll each output port connected to the output interface 33.

Furthermore, a shaping control unit 43 is included in the output arbitrator 40 in FIG. 4 which produces an indication signal (d) that controls port shaping operation by measuring output timing of each output port. An output port number selecting unit 44 is connected to the judging unit 41, the polling unit 42, and the shaping control unit 43, and a port-address translator 45 and is operable to select an output port number of an output port to which a cell data should be sent.

Specifically, the output port number selecting unit 44 selects an output port that can output cells at regular intervals by referring to a result of judgement in the judging unit 41 ($b$), an indication signal from the shaping control unit 43 ($d$), and a polling result of the polling unit 42. Thereafter, the output port number selecting unit 44 sends out the selected output port number to the queue controller 23 and the port-address translator 45. The port-address translator 45 translates the output port number into a physical address and outputs the physical address to the output interface 33. Responsive to the output port number from the output port number selecting unit 44, the queue controller 23 reads the cell data stored in the shared buffer 10 by using a queue stored in a head or a leading port of an OAQ corresponding to the output port number.

Figure 5:
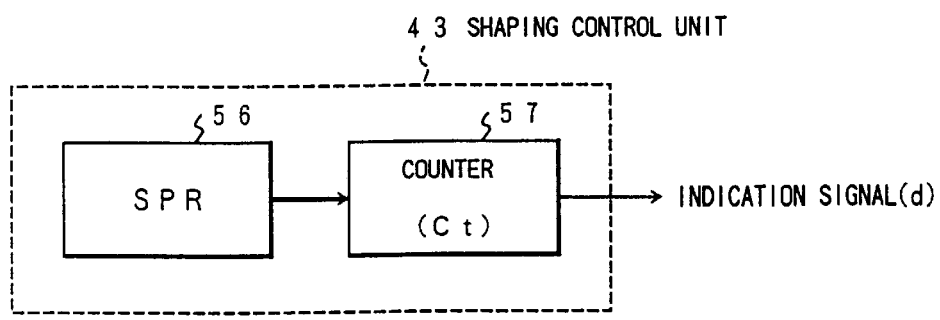
FIG. 5 shows a block diagram for use in describing a shaping control unit illustrated in FIG. 4.

In reference to FIG. 5, the shaping control unit 43 shown in FIG. 4 has a shaping rate register (SRR) 56 and a counter (Ct) 57. In the SPR 56, a shaping rate and an output transfer rate in each output port are kept in advance. Especially, the shaping rate is assumed to be given by 1/(SPR+1) in this unit 43. In the CT 57, its default value (SPR+1) is set and is decreased at every one of the basic cycle. Such a decrease of the default value is carried out for each output port. When a count or the value of the Ct 57 becomes zero for a certain one of the output ports, an indication signal (d) for the output port is sent out to the output port number selecting unit 44. This indication signal (d) is indicative of the timing at which a cell is transmitted from the output port.

As understood from the above, the arbitrator 40 determines an output port to send out cell data. In this event, the output port is determined by confirming the timing to output cells, the transfer condition of the physical devices, and the remnant cell. From this fact, it is readily understood that the arbitrator 40 confirms the transfer condition of physical devices that are connected to the output ports and the remnant cells to output in each output port.

Now, operation of the port shaping method will be described in the case where a cell is input at a trunk rate of 155 Mbps and is routed to an output PHY device at a processing rate of 52 Mbps.

In the output arbitrator 40 illustrated in FIG. 4, the polling unit 42 detects whether or not the output PHY device can process the cell by polling a corresponding output port. A result of detection is sent to the output port number selecting unit 44. On the other hand, the shaping control unit 43 sends out the timing indicated by the indication signal (d) to the output port number selecting unit 44 at a shaping rate of the output port, namely, a rate that corresponds to a shaping rate determined by the process rate of the output PHY device (52 Mbps) in this device.

Coupled to the output port number selecting unit 44, the judging unit 41 judges whether or not a cell data for a desired output port is stored in the shared buffer 10, with reference to a queue in the OAQ corresponding to the output port of the queue controller 23. A result of judgement in the judging unit 41 is sent as a judgement signal (b) to the output port number selecting unit 44. In case that the output port number selecting unit 44 recognizes in response to the judgement signal (b) that the shared buffer 10 stores the cell in question, the output port number selecting unit 44 outputs the output port number to the queue controller 23 and the port-address translator 45 by referring to the polling result of the output port and by following the timing signal (d). Herein, it is to be noted that the output port number selecting unit 44 recognizes the cell which should be sent out to the output port corresponding to the output PHY device with a 52 Mbps processing rate.

In the illustration example, the port-address translator 45 translates the output port number into a physical address that shows an output device and outputs the physical address to the output interface 33.

As described above, the illustrated output arbitrator 40 carries out port shaping operation by controlling the readout timing from the shared buffer 10. In other words, the reading time is adjusted by the use of the output arbitrator 40 and the shared buffer 10 when each cell is accumulated in the buffer 10. Specifically, each accumulated time of the ATM cell in the shared buffer 10 serves as a delay time to absorb each CDV. This means that the shaping FIFOs of each output port can be eliminated which are mentioned in conjunction with the conventional device.

Figure 6:
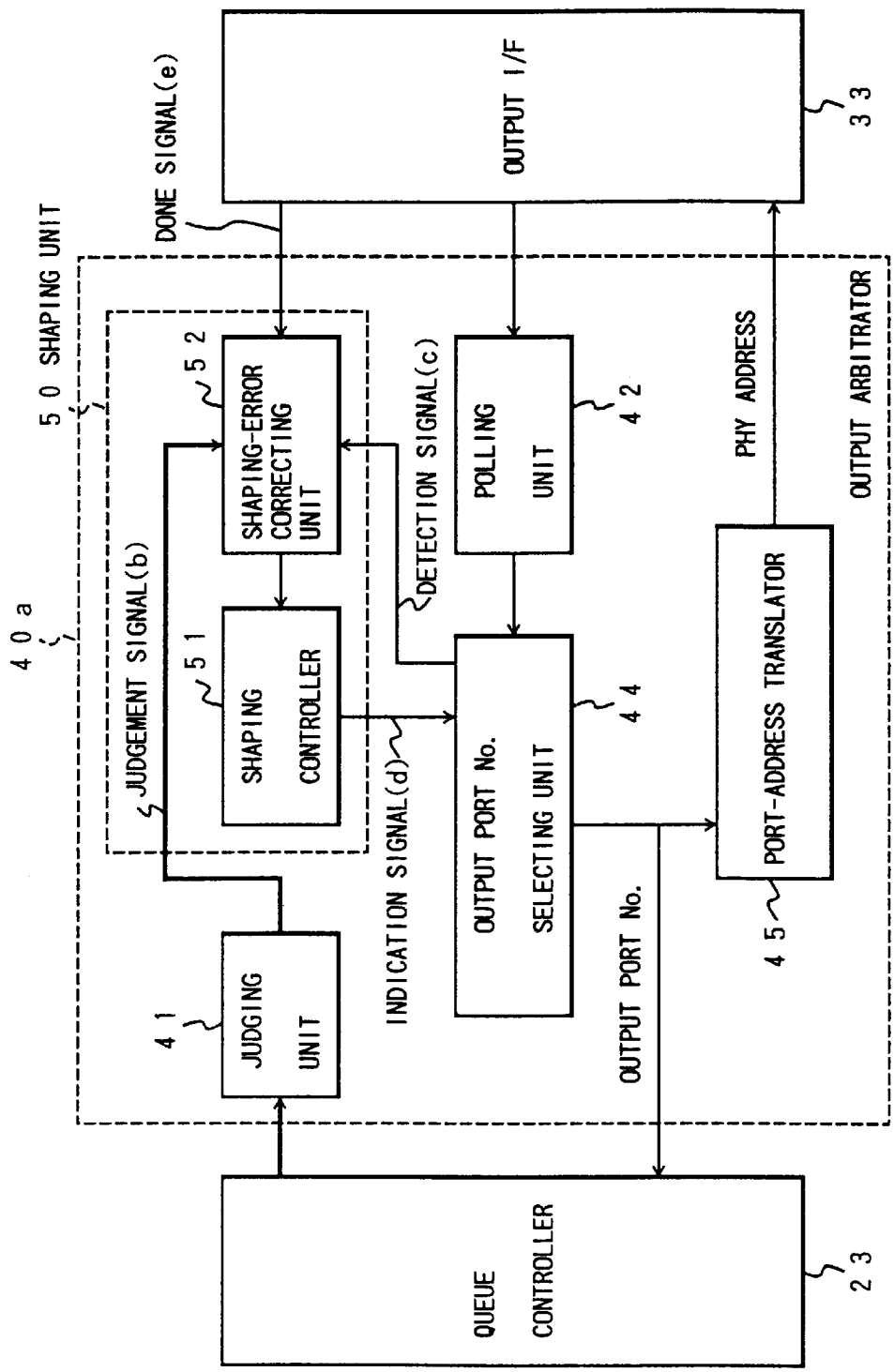
FIG. 6 shows a block diagram for use in describing another output arbitrator according to this invention.

Referring to FIG. 6, the ATM device according to the another embodiment of this invention is similar to that illustrated in FIG. 4 except that an output arbitrator 40*a* is somewhat different in structure from the output arbitrator 40 in FIG. 4. The output arbitrator 40*a* in FIG. 6 differs from the output arbitrator 40 in FIG. 4 in view of the fact that the output arbitrator 40*a* can correct errors which might occur during the shaping operation. For this purpose, the illustrated output arbitrator 40*a* includes a shaping unit 50 which includes a shaping-error correcting unit 52 and a shaping controller 51 both of which are operated in a manner to be described with reference to FIGS. 7A through 7C. At any rate, the illustrated shaping unit 50 serves to prevent a situation that the assigned timing falls below a rate set in advance. That is, the shaping unit 50 prevents a reduction of throughput of the assigned timing, which might occur by cell variation. Such cell variation results from compiling and multiplexing cells.

Figure 7A:
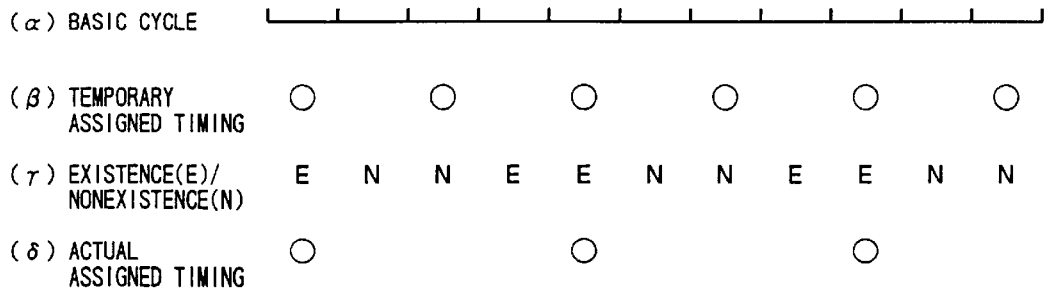
FIG. 7A shows a time chart for use in describing an operation of the output arbitrator which is carried out when no shaping-error is corrected.

As for the output #0, the port shaping result without the correction of shaping errors, namely, the result with the output arbitrator 40, is shown in FIG. 7A. The drawing shows a relation between a basic cycle ($\alpha$) determined by a clock and temporary assigned timing ($\beta$) determined for the output port #0. As understood from the relation between the basic cycle ($\alpha$) and the temporary assigned timing ($\beta$), a cell is assigned to the output port #0 at every other basic cycle.

In FIG. 7A, existence/nonexistence of cells is shown along the third line ($\gamma$). Herein, it is noted that "E" shows existence of the cells in the shared buffer 10. In this event, such cells should be sent out to the output port #0. On the other hand, "N" shows no existence of such cells in the shared buffer 10.

In this process, a cell is actually allocated to the output port #0 only if the cell exists in the shared buffer 10 at the temporary assigned timing ($\beta$), because the port shaping operation is carried out without the shaping error correction. Thus, the actual timing of a cell assigned to the output port #0 is illustrated along the fourth line ($\delta$) in FIG. 7A.

As a result, the actual assigned timing ($\delta$) in this process appears at a ratio of one to four basic cycles ($\alpha$), namely, at every fourth basic cycle and therefore becomes below the ratio of one to two basic cycles ($\alpha$), namely, the ratio of the temporary assigned timing ($\beta$).

Figure 7B:
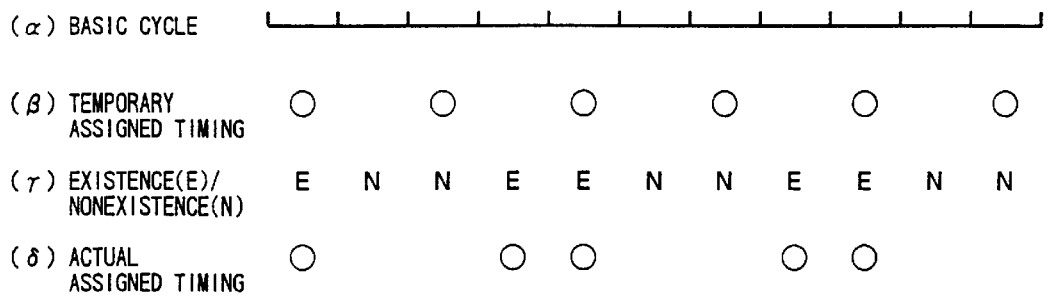
FIG. 7B shows a time chart for use in describing an operation of the output arbitrator which is carried out when shaping-error is corrected.

On the other hand, as understood from the reference to FIG. 7B, the shaping unit 50 of the output arbitrator 40*a* in FIG. 6 prevents a reduction of the actual assigned timing shown in FIG. 7A by adjusting or correcting the shaping errors.

For further details, the shaping unit 50 of the output arbitrator 40*a* corrects shaping errors by the use of the shaping error correcting unit 52 and the shaping controller 51 as will be described below. If no cell should be sent out to the output port #0 and exists in the shared buffer 10 at a temporary assigned timing ($\beta$), the shaping error correcting unit 52 selects one of the basic cycles ($\alpha$) after the temporary assigned timing ($\beta$) in question. In this event, it is to be understood that the selected basic cycle mentioned above satisfies a condition that the shared buffer 10 stores a cell corresponding to the output port #0. The shaping controller 51 outputs an indication signal (d) by referring to the judgement of the shaping error correction unit 52, as shown in FIG. 7B, and thereby prevents a reduction of an actual assigned timing ($\delta$) by assigning the selected basic cycles to the actual assigned timing ($\delta$).

Figure 7C:
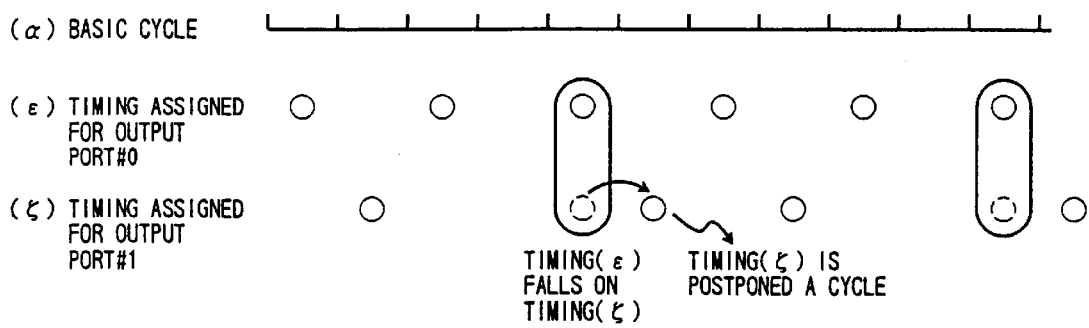
FIG. 7C shows a time chart for use in describing an error correction operation of the output arbitrator which is carried out when a plurality of output ports are allocated to a physical line.

Furthermore, as shown in FIG. 7C, the output arbitrator 40*a* in FIG. 6 can correct a shaping error even when a physical trunk is connected to plural output ports, such as the output port #0 and #1.

The above mentioned explanation will be further made below.

Given that a temporary timing ($\epsilon$) for the output port #0 is assigned at a rate of two basic cycles ($\alpha$), namely, at every second basic cycle, as shown in FIG. 7C and that a temporary timing (ξ) for the output port #1 is assigned at a rate of three basic cycles (α), namely, at every third basic cycle, the temporary timing (ξ) for the output port #1 coincides with the temporary timing (ε) assigned for the output ports #0 at a rate of six basic cycles (α), at every sixth basic cycle, as illustrated by a broken circle in FIGS. 7A through 7C. As mentioned above, when temporary timings assigned for plural output ports coincide with each other, cells would be only sent out to a preferred output port, and cells supposed to be sent out to other output ports would remain unsent until next temporary assigned timing without any processing. Consequently, shaping errors would happen.

However, the output arbitrator 40*a* can prevent the above mentioned shaping errors by activating the output port number selecting unit 44 and the shaping unit 50 as described below. The output port number selecting unit 44 at first judges whether or not there happens a conflict of output cells (or output ports). If such a conflict is detected, the output port number selecting unit 44 supplies the shaping unit 50 with a detection signal (c) representative of occurrence of the conflict.

Responsive to the detection signal (c), the shaping unit 50 outputs an indication signal (d) to a preferred output port, and then outputs indication signals to other output ports by utilizing uncompetitive timings of the basic cycles. For instance, when the temporary timing (ε) for the output port #0 and the temporary timing (ξ) for the output port #1 conflict with each other as specified by a oval circle, the shaping unit 50 recognizes the conflict by receiving the detection signal (c) from the output port number selecting unit 44. Herein, the detection signal (c) shows the conflict. Thereafter, the shaping unit 50 outputs an indication signal (d). As the result, next uncompetitive basic cycle is assigned as an actual assigned timing (ξ) for the output port #1 after the shaping unit 50 outputs a preferred indication signal (d) that directs the output port #0 to send cells out.

This process enables the shaping unit 50 in the output arbitrator 40*a* to correct shaping errors when plural ports are connected to a single physical trunk.

As described above, the shaping unit 50 in FIG. 6 can prevent cell flicker, namely, cell variation because of the shaping controller 51 and the shaping-error correcting unit 52 when there exists no cell in the shared buffer 10 at an assigned output timing or when output timings of plural output ports coincide in case that the plural output ports are connected to a single output port.

Specific structure of the shaping unit 50 in FIG. 6 will be explained next in reference with FIG. 8. A following explanation will be focused on one of output ports, and the one output port will be described below as a specific output port as a matter of convenience.

Figure 8:
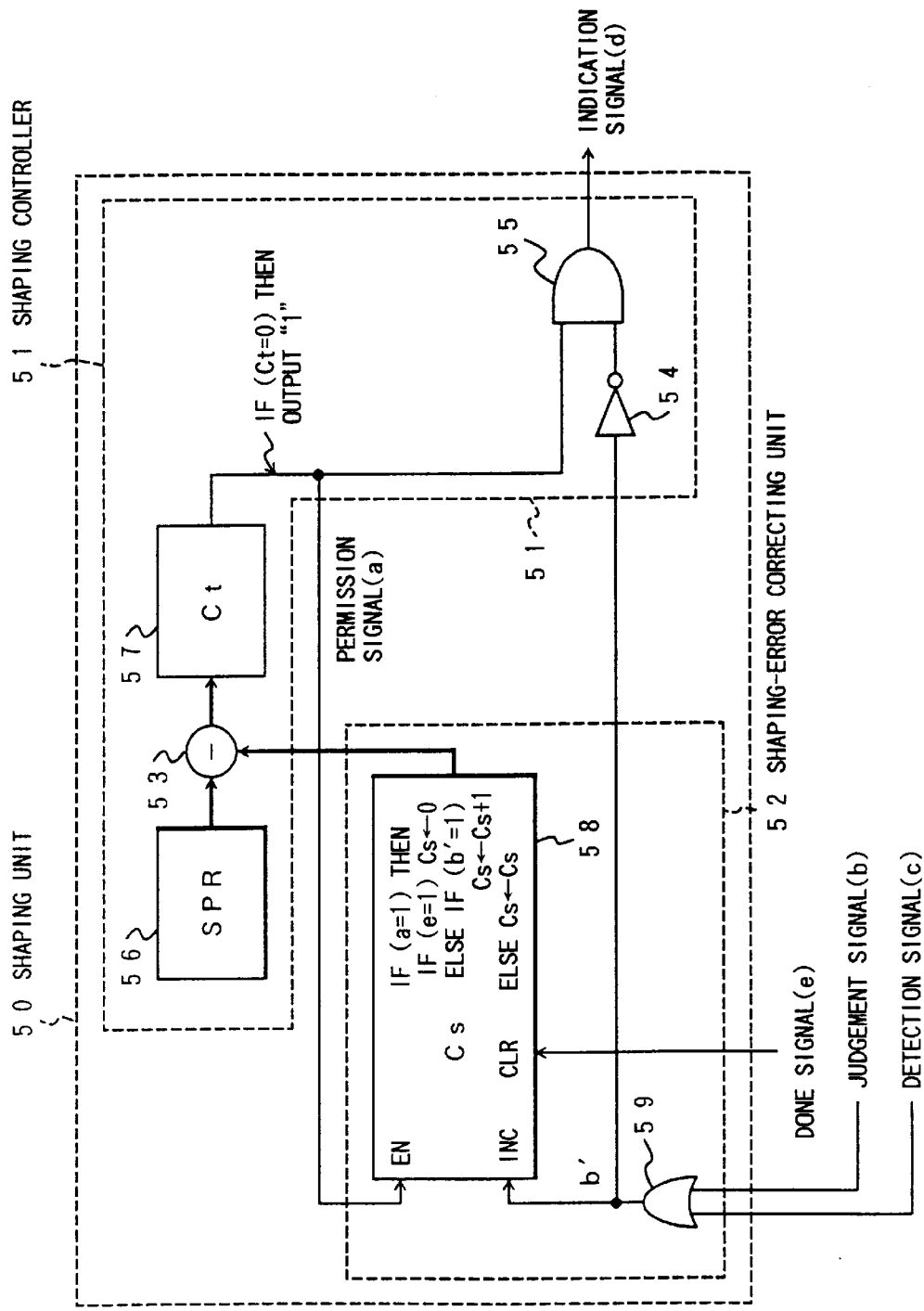
FIG. 8 shows a block diagram for use in specifically describing the shaping unit illustrated in FIG. 5.

Referring to FIG. 8, the shaping unit 50 shown in FIG. 6 comprises a shaping-rate setting register (SPR) 56, a counter (Ct) 57, a subtracter 53, a shaping-rate error correcting counter (Ce) 58, an inverter 54, an AND gate 55, and an OR gate 59. Among those components, the substractor 53, the inverter 54, the AND gate 55, the SPR 56, and the Ct 57, are operable as the shaping controller 51 while the other components are operable as the shaping-error correcting unit 52.

In the shaping-rate setting register (SPR) 56, a shaping rate is given. In this embodiment, an output transfer rate, namely, a shaping rate, is set to 1/(SPR+1). Besides, the SPR 56 can be set to a value ranging from 0 to N.

The Ct 57 counts down from N to 0 to indicate a count between N and 0. In this embodiment, the count of Ct 57 is set to the value of the SPR as an initial value. Decrement of the value of the Ct 57 is made at every basic cycle, and the Ct 57 produces a permission signal transmitted to the specific output port when the value of the Ct becomes zero. Besides, the permission signal produced by the Ct 57 takes "1" in this embodiment.

The shaping-rate error correcting counter (Cs) 58 can be counted up from 0 to M. The count of the Cs 58 shows the number of the basic cycles that can be used for error correction. The above explanation are as follows.

Shaping-Rate Setting Register (SPR):
Sets an output transfer rate to 1/(SPR+1).
Has one of 0~N numbers as a setting value.
Counter (Ct):
Has one of 0~N number as a counter value.
Issues an output permission to the specific output port when the counter value becomes zero.
Shaping-Rate Error Correcting Counter (Cs):
Has one of 0~M numbers as a counter value.
The count shows a number of the basic cycles that can be used for error correction.

Now, operations of these counters and output timings of cells will be explained below in reference with FIG. 8 and FIG. 9. Besides, the judgement signal (b) is supposed to show "1" when no cell data to be sent out to the specific output port exists in the shared buffer 10 and "0" when a cell data to be sent out to the specific output exists in the shared buffer 10. When the output port number selecting unit 44 recognizes that there is a conflict between the specific output port and other output ports, the detection signal (c) is supposed to show "0" in case that the specific output port wins the conflict, and to show "1" in case that the specific output port loses the conflict. In this explanation, the former case, namely, the case that the specific output port wins the conflict, also includes a case that there is no conflict between the specific output port and other output ports.

Now the outline will be described below in reference with FIG. 8 in terms of operations of each component.

As mentioned above, the initial counter value of the Ct 57 is set to the value of the SPR 56, and the decrement of the count is made at every basic cycle. As a result, when the counter value of the Ct 57 becomes zero, the Ct 57 permits the specific output port to send out a cell, enabling the permission signal ("1" in this embodiment).

At the timing when the Ct 57 outputs the output permission, if a cell to be set out to the specific output exists in the shared buffer 10 and it is detected that the specific output port wins the conflict, the OR gate 59 outputs a logic of "0", taking an OR of the judgement signal (b) and the detection signal (c).

Therefore, the AND gate 55 outputs a logic of "1" since an output of the inverter 54 to invert the output of the OR gate 59 becomes a logic of "1". As understood from the reference with FIG. 8, the output signal from the AND gate 55 is sent out to the output port number selecting unit 44 as an indication signal (d) from the shaping unit 50. As a result, the cell is sent out at the timing when the Ct 57 issues the output permission. In this point, a remaining initial value of the Ct 57 having been subtracted from the counter value of the Cs 58 is loaded, as counter value of the Ct 57, through the subtracter 53.

It seems that no cell to be sent out to the specific output port exists at the timing the permission signal (a) output from the Ct 57 shows "1", or that if it is detected that the specific output port loses the conflict at the same timing. The former is shown by the judgement signal (b) of "1" and the permission signal (a) of "1". On the other hands, the later is shown by the detection signal (c) of "1" and the permission signal of "1". In condition, cells to be output to the specific output port remains unsent and the value of the Ct 57 remains same.

Now, a counter operation of the shaping-rate error correcting counter (Cs) 58 will be explained as follows. An initial value of the counter Cs 58 is set to "0". And a value of the counter Cs 58 also becomes zero at a timing that satisfies the following three conditions; 1) there exists a cell to be sent out to the specific output port; 2) the permission signal (a) becomes "1" and then is issued to the specific output port; 3) the cell is obtained without a conflict.

On the other hand, when the counter value of the Ct is zero, namely, the permission signal (a) is "1", and the output permission is issued to the specific output port, increment of the value of the Cs 58 is made if there exists no cell to be sent out to the specific output port.

Further explanation will be made in reference to FIG. 9. FIG. 9 shows an operation in case that a shaping rate is ½, namely, a value of the shaping-rate setting register (SPR) is "1". In this case, the initial value of the Ct 57 is set to "1", namely, the value of the SPR, and the initial value of the Cs 58 is set to "0". And the specific output port is configured the temporary assigned timing (β) shown in FIG. 9. Besides that, it is supposed that FIG. 9 shows it is detected the specific output port wins a conflict even if there is no conflict.

Figure 9:
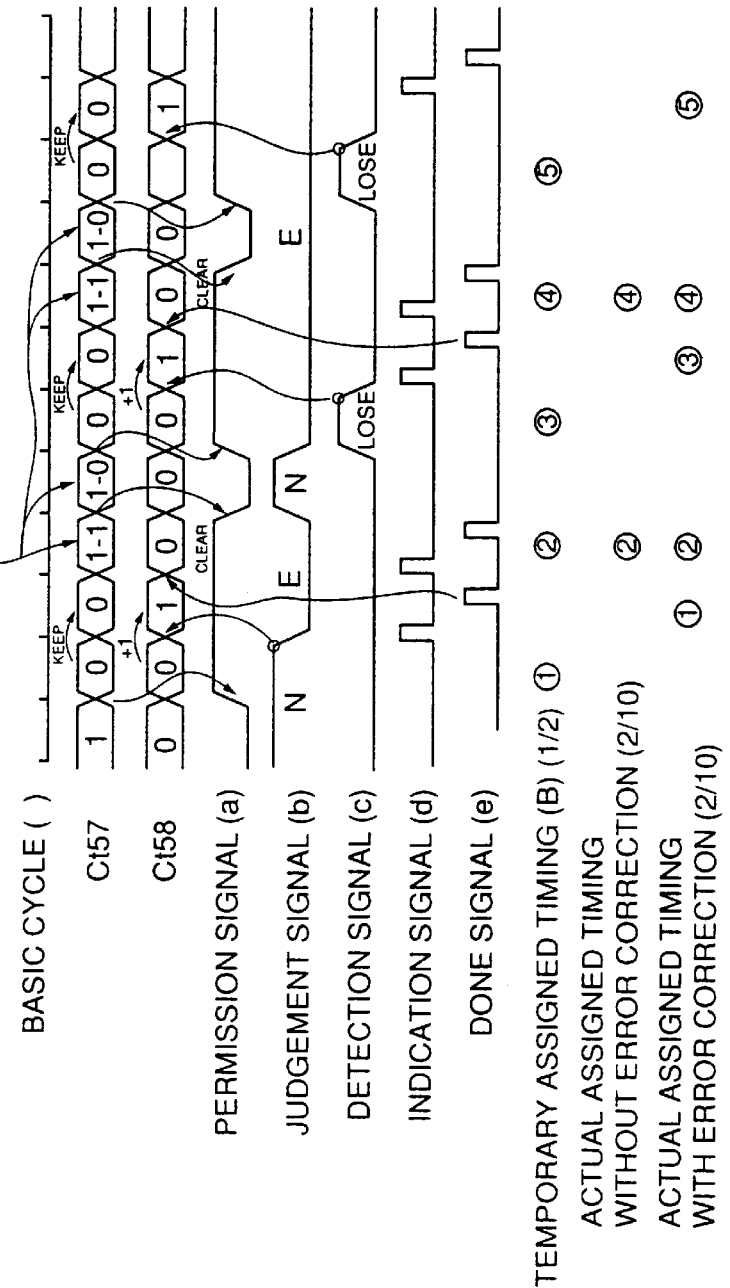
FIG. 9 shows a waveform for use in describing the operation of the shaping unit illustrated in FIGS. 7A through 7C.

In this case, as described in FIG. 9, the permission signal (a) keeps outputting a value of "1" while the value of the Ct 57 remains "0". While the permission signal (a) keeps a value of "1", if no cell to be output exists, or, if it is detected that the specific output port loses the conflict, the judgement (b) or the detection signal (c) becomes a logic of "1" and the indication signal (d) is disabled, namely, the indication signal becomes a logic of "0". On the other hand, if some cells to be output exists and if it is detected that the specific output port wins the conflict, both the judgement (b) and the detection signal (c) becomes a logic of "0" and the indication signal (d) is enabled, namely, the indication signal becomes a logic of "1".

Therefore, if there is a cell to be sent out and it is detected that the specific output port wins the conflict, as shown in the last part of FIG. 9, an indication signal (d) is outputted at a timing of one basic cycle after the temporary assigned timing (β), and thereby error correction is made. In this situation, the Cs 58 clears the counter value to "0", if the output I/F 33 sends out, to the Cs 58, a "completion" signal indicative of completion of transmitting the cell into the outgoing trunk corresponding to the specific output port.

For further development of the concept from this embodiment, it is supposed that a setting value of the shaping-rate setting register (SPR) is "n". In this setting, it can be easily understood that the shaping rate is limited to a shaping rate, 1/(n+1) of the maximum throughput. This means that the output permission from the Ct 57 is given in the (n+1) basic cycles. Needless to say, if the setting value of the SPR is zero, the shaping can not be done since the shaping rate is (1/1).

When the correction of the shaping error is indicated, the Cs 58 counts a basic cycle between the timing of the output permission for the specific output port and the timing of the cell output, and thereby the result is reflected on a basic cycle of (n+1) cycles for next cell output. For example, if a cell is output at "m" cycles after the timing of the output permission for the specific output port, the Cs counter obtains a timing of next output permission by recognizing a value of the Cs counter for the timing of the next output permission as (n+1−m) cycles since the Cs has already counted "m" cycles and therefore "m" cycle must be subtracted from (n+1) cycles.

As explained above, according to this invention, a smaller scale of hardware of an ATM device can be achieved in comparison with conventional ATM devices because a buffer essentially included the ATM devices, such as the shared buffer, absorbs cell delay variations and thereby shapes cells by the CDV absorption. Besides, the ATM device according to this invention can prevent a reduction of the actual throughput by absorbing cell variations owning to compiling and multiplexing a cell, namely, the cell variation.

What is claimed is:

1. An asynchronous transfer mode (ATM) device including a plurality of input ports, a plurality of output ports, a shared buffer supplied with input cells sent through said input ports for successively storing said input cells to transmit said input cells as output cells to said output ports, and a switch core for controllably switching said shared buffer, wherein:

said switch core compromises:

a judging section for judging presence of a stored cell stored in said shared buffer for each output port; and a shaping control section which has a shaping rate for each output port and which produces an output indication signal at a cell output timing when said stored cell is to be outputted;

said switch core being operable in a manner such that, if said judging section judges the presence of said stored cell in said shared buffer, said stored cell is read from said shared buffer and outputted through a particular output port for which said output indication signal is produced by said shaping control section.

2. An ATM device as claimed in claim 1, wherein said switch core comprises:

a queue controller for carrying out queue control to write and read said input and said output cells in and from said shared buffer; and an output port selecting section supplied with said output indication signal from said shaping control section for informing said queue controller of said particular output port in case where said judging section judges the presence of said stored cell in said shared buffer.

3. An ATM device as claimed in claim 1, wherein said shaping control section shifts the cell output timing in case where no stored cell is present in said shared buffer at the cell output timing.

4. An ATM device as claimed in claim 1, wherein said shaping control section shifts, in case where cell output timings for at least two output ports are coincident with each other, one of the cell output timings.

5. An ATM device as claimed in claim 1, wherein said shaping control section comprises:

shaping error correcting means supplied with a stored cell absence signal representative of absence of the stored cell in said shared buffer and a permission signal with respect to a specific output port for producing a timing error signal representative of a timing error between said stored cell absence signal and said permission signal; and a shaping controller responsive to the timing error signal from said shaping error correcting means for producing said output indication signal controlled in timing.

6. A port shaping method for use in an asynchronous transfer mode (ATM) device including a plurality of input ports, a plurality of output ports, a shared buffer supplied with input cells sent through said input ports for successively storing and input cells to transmit said input cells as output cells to said output ports, and a switch core for controllably switching said shared buffer, wherein:

said switch core is provided with a judging section for judging presence of a stored cell stored in said shared buffer for each output port and a shaping control section which has a shaping rate for each output port and which produces an output indication signal at a cell output timing when said stored cell is to be outputted;

said switch core being operable in manner such that, if said judging section judges the presence of said stored cell in said shared buffer, said stored cell is read from said shared buffer and outputted through a particular output port for which said output indication signal is produced by said shaping control section.

* * * * *